(No Model.)
G. E. MEDLEY.
FISHING REEL.
No. 535,386. Patented Mar. 12, 1895.
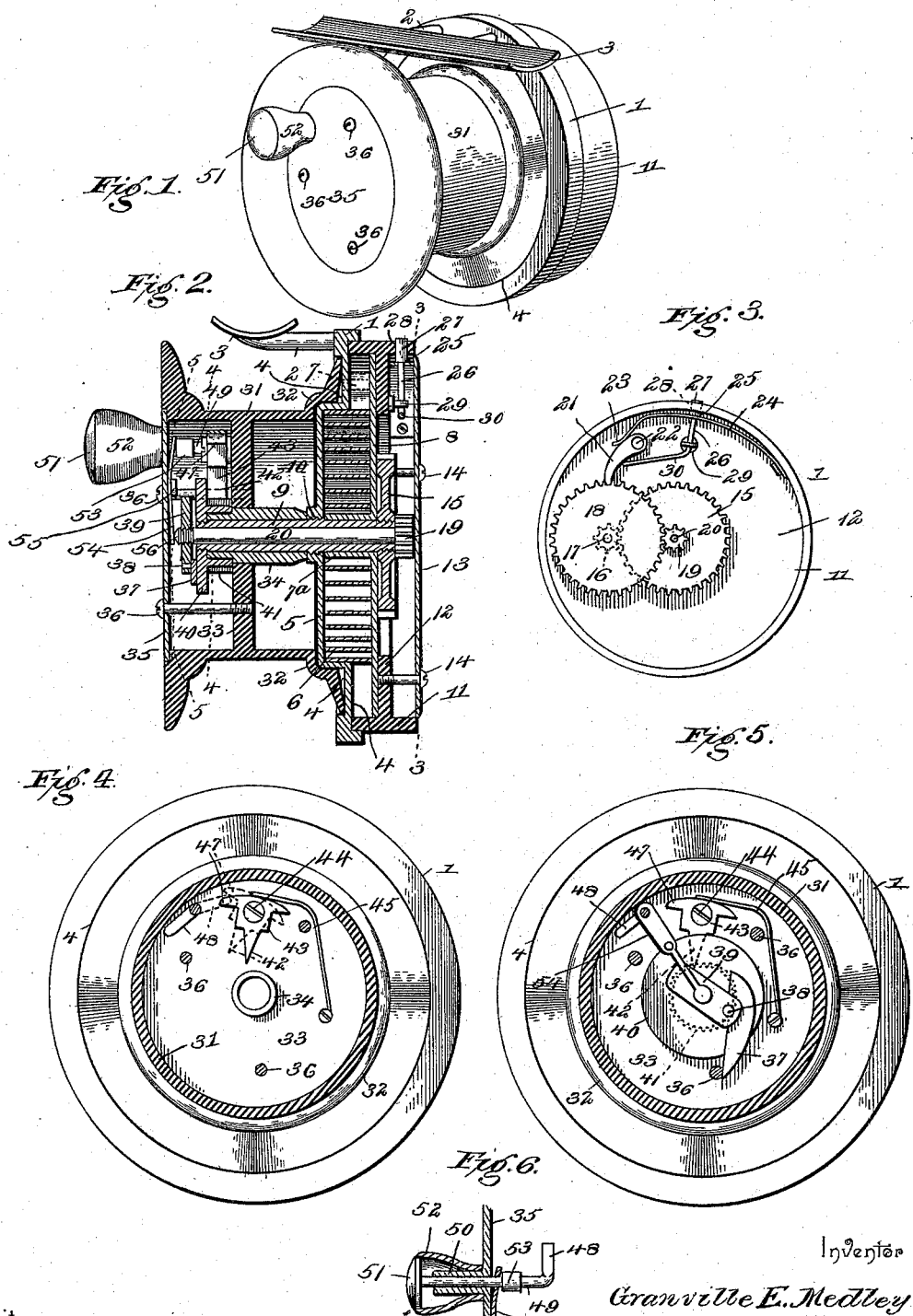
Witnesses
John C. Shaw
Inventor
Granville E. Medley
By his Attorneys.
C. A. Snow & Co.

UNITED STATES PATENT OFFICE.

GRANVILLE E. MEDLEY, OF HOPKINSVILLE, KENTUCKY.

FISHING-REEL.

SPECIFICATION forming part of Letters Patent No. 535,386, dated March 12, 1895.

Application filed October 11, 1894. Serial No. 525,616. (No model.)

*To all whom it may concern:*

Be it known that I, GRANVILLE E. MEDLEY, a citizen of the United States, residing at Hopkinsville, in the county of Christian and State of Kentucky, have invented a new and useful Fishing-Reel, of which the following is a specification.

This invention relates to automatic fishing reels, and it has for its object to provide a combination reel of this character that can be used either automatically or as an ordinary hand-operated reel.

To this end the main and primary object of the present invention is to effect certain improvements in reels of this character whereby the same will provide simple and efficient means for hooking, playing, breaking down and drawing in the fish automatically without the intervention of the angler, and at the same time the reel contemplates a construction that allows the line to be cast out as easily as in other reels; will wind up slack line faster than a fish can swim, or as slowly as desired; and one that is also automatic in setting the click alarm and drag, and in unsetting the click alarm and taking off the drag. In the attainment of this object the invention particularly contemplates an improvement in the construction of the automatic reel set forth in my former patent, No. 481,330.

With this and other objects in view, which will readily appear as the nature of the invention is better understood, the same consists in the novel construction, combination, and arrangement of parts hereinafter more fully described, illustrated, and claimed.

In the accompanying drawings:—Figure 1 is a perspective view of an automatic fishing reel constructed in accordance with this invention. Fig. 2 is a central longitudinal sectional view of the reel. Fig. 3 is a sectional view on the line 3—3 of Fig. 2. Fig. 4 is a similar view on the line 4—4 of Fig. 2. Fig. 5 is a similar view on the line 5—5 of Fig. 2. Fig. 6 is an enlarged detail sectional view of the crank handle device.

Referring to the accompanying drawings, 1 designates a stationary reel plate that has attached to one edge thereof a pair of offstanding attaching posts 2, to which is secured a curved seat plate 3, adapted to be fitted to the fishing rod in the usual manner and providing means for holding the plate 1 stationary in its attached position. The stationary reel plate is provided upon both sides with the bearing counter-sinks 4, and within the circle of said countersinks is provided with an offstanding circular spring recess or pocket 5, that is adapted to partly accommodate therein the spiral actuating spring 6, one terminal of which is connected to the fixed pin or stud 7, projected from one side of the plate 1, and the other terminal of said spring is adapted to be engaged with the bearing hub 7$^a$, projected centrally from one side of the intermediate drum plate 8, and loosely turning on the stationary tubular bearing sleeve or spindle 9, that is fitted at 10, centrally within the stationary plate 1, and projects to both sides of the said plate, and one end of said bearing sleeve 9, also projects through the hub 7$^a$, and slightly beyond one side of the intermediate drum plate 8.

The intermediate drum plate 8, is secured centrally within the revolving winding drum 11. The revolving winding drum 11, is provided with an interior annular flange 12, to which the plate 8 is attached and is inclosed at its outer open side by the removable side cap plate 13, receiving the fastening screws 14, that engage in the inner flange 12, and the inner side of said revolving winding drum snugly registers within one of the bearing countersinks 4, at one side of the stationary plate 1, thereby completing a very compact arrangement of the stationary reel plate, the actuating spring 6, and the drum 11, so that these parts of the reel will occupy as little space as possible.

The projecting end of the bearing sleeve 9, at one side of the intermediate drum plate 8, has mounted fast thereon a central cog wheel 15, around which rolls and meshes the pinion 16, mounted loosely on the stub shaft 17, projected from one side of the intermediate hub plate 8, and also carrying an idler cog wheel 18, that meshes with the shaft pinion 19, located at one side of the cog wheel 15, and mounted on one end of the rotating reel shaft 20, that turns within the tubular bearing sleeve or spindle 9, and projects beyond both ends thereof to provide for transmitting motion to the spool of the reel in the manner to be presently described. The idler cog wheel 18, is adapted to be engaged and disengaged by an adjacent catch pawl 21, pivoted at one end as at 22, to one side of the inner flange 12, of the drum 11, and the catch or point end of said pawl 21, is adapted to be abnormally engaged with the teeth of the wheel 17, by means of the free end 23, of the leaf spring 24, bearing thereon at one side. The said leaf spring 24, is secured fast at one end to the inner side of the drum 11, and is provided at a point intermediate of its ends with a pin opening 25, through which passes the movable pawl adjusting pin 26. The movable pawl adjusting pin 26, is provided with an enlarged push head 27, that works through an opening 28, formed in the rim of the drum 11, and the spring 24, normally bears against the shoulder under the push head 27, and therefore normally projects such push head out through the opening 28, in the rim of the drum. The said adjusting pin 26, is guided in its sliding movement within the drum through a guide eye 29, fitted inside of the drum, and said pin is provided with an inner angled end 30, the extremity of which bears under or against the inner side of the pawl 21, opposite the spring end 23. The normal pressure of the spring 24, to move the spring 26, outward, holds the pawl 21, normally disengaged from the cog wheel 28, so that the winding drum can freely rotate in any direction, and by pressing the adjusting pin inward, the spring 24, will move the pawl in engagement with the teeth of the wheel 18, to prevent rotation of the drum in one direction as will be more particularly referred to.

The tubular bearing sleeve or spindle 9, at one side of the stationary reel plate 1, supports for rotation thereon the line-spool 31, which, as well as the winding drum 11, are preferably made of vulcanized rubber. The said spool 31, is provided with the countersunk side flange 32, at one side that loosely works over the offstanding recess or pocket portion 5, of the plate 1, and also loosely registers in one of the side bearing countersinks 4, of said stationary plate in order to complete the compact arrangement of the several parts of the reel. The spool 31, is provided with an integral intermediate web portion 33, having a central bearing hub or collar 34, that loosely turns on the bearing sleeve 9, in which turns the shaft 20, and the space at one side of the intermediate spool web 33, is inclosed by the removable cap plate 35, secured to the outer open side of the spool by means of the stop screws or pins 36, the inner ends of which are engaged in the intermediate web portion 33, and said stop screws or pins 36, are arranged at regularly spaced distances apart within the space inclosed by the cap plate 35, and are adapted to be engaged by one end of the eccentric crescent shaped clutch plate 37.

The crescent shaped clutch plate 37, is eccentrically pivoted by means of the pivot pin 38, to one end of the revolving shaft plate 39, fitted fast to and carried on one end of the rotating reel shaft 20, beyond one end of the tubular bearing sleeve or spindle 9, and by reason of the eccentric pivoting of the clutch plate 37, it will be obvious that when the shaft 20, is turned in one direction, the said clutch plate will fold back against the end of the shaft 20, at the inner side of the plate 39, and will therefore lie inside of the circle of the screws or pins 36, so as not to engage the same, while on the other hand when the shaft turns in an opposite direction, the long end of the clutch plate 39, will swing out to a position within the circular path of the screws or studs 36, so as to engage therewith and thereby cause the spool 31, to be rotated with the shaft 20.

The eccentrically pivoted clutch plate 37, works between the shaft plate 39, to which it is attached, and the stationary click wheel plate 40, that is fastened by means of threads or other suitable means on one end of the bearing sleeve or spindle 9, and the said click wheel plate 40, is provided at its inner side with an integral toothed click wheel portion 41, over the teeth of which is adapted to ride the pointed end 42, of the T-shaped click dog 43. The T-shaped click dog 43, is pivotally secured to one side of the spool web 33, by means of the pivot screw 44, and arranged to bear on the outer end or head of the dog 43, slightly at one side of its pivot is one end of the L-shaped leaf spring 45, the other end of which is secured fast as at 46, to one side of the spool web 33, and by reason of the disposition of the dog 43, and the arrangement of the spring 45, the said dog will sharply click or ride over the teeth of the click wheel 41, when it is desired for the click alarm to be given after the line has been cast for a fish.

The T-shaped click dog 43, is provided at both sides of its point of pivot with the lugs or shoulders 47, that, together with the point end 42, give a T-shaped appearance to the dog, and one of these lugs 47, is adapted to be engaged by the inner angled end 48, of the L-shaped adjusting spindle 49. The L-shaped adjusting spindle 49, is arranged to work in a tubular bearing post 50, projected from the outer side of the cap plate 35, of the spool, and the said L-shaped spindle 49, is provided at its outer end with a rounded friction head 51, that is adapted to register within the outer open end of the tubular crank handle 52, also mounted to turn on the tubular bearing post 50. At a point adjacent to the inner side of the cap plate 35, the L-shaped spindle 49, is provided with a collar 53, against which bears one end of a double-leaf-spring 54, that is secured intermediate of its ends as at 55, to the inner side of the cap plate 35.

The tension of the spring 54, on the spindle 49, holds the same in frictional engagement with the tubular crank handle 52, so that ordinarily said spindle will turn or revolve with the crank handle in the act of turning the spool thereby, and by reason of the disposition of the inner angled end 48, of the said spindle 49, it will be obvious that in the act of turning the spool in one direction said inner angled end 48, of said spindle will be carried against one of the lugs or shoulders 47, and will disengage and hold the dog 43, disengaged from the click wheel 41, thereby unsetting the alarm. On the other hand in the act of turning the spool in the opposite direction, the inner angled end 48, of the spindle will be carried out of engagement with the click dog and will allow the same to spring back into engagement with the click wheel, thereby setting the click alarm as will be easily understood. The end of the double leaf-spring 54, opposite the end connected with said adjusting spindle, is adapted to bear against the pointed end 56, of the shaft 20, outside of the shaft-plate 39, and in this particular it is to be noted that the shaft 20, has a slight longitudinal play so that the action of the spring 54, bearing thereon will hold the clutch plate 37, sufficiently tight against the plate 40, so that when the clutch plate is in its folded position inside of the circle of the said plate 40, and therefore of the stop screws or pins 36, the said clutch plate will remain in this position without danger of being shaken loose so as to drop into the path of the screws or pins 36, as will be readily understood.

From the above it is thought that the construction of the herein described reel will be readily apparent to those skilled in the art, and the several uses of the reel both for automatic action and as a common hand reel will therefore be easily understood. In the first place it is necessary to wind up the spring 6, to set the reel for operation, and to do this it is simply necessary for the angler to grasp the drum 11, and turn the same in one direction which causes a winding up of the spring. In the act of winding it will be understood that the shaft 20, will turn in a direction that causes the eccentrically pivoted clutch plate 38, to fold back within the circle of the click wheel plate 40, and therefore out of the path of the screws or pins 36, so that the line-spool 31, will not revolve. At the same time the drum is turned to wind up the spring, with the thumb pressed on the head of the pawl adjusting pin 26, the catch pawl 21, will freely ride in engagement with the cog wheel 18, so that when the rotation of the drum is stopped with the thumb still pressed on the head of said adjusting pin, the pawl 21, will serve to lock the drum against rotation. In this adjustment of the reel, it will also be noted that the clutch plate 37, will remain in its folded position and will be held in this position by means of the spring 54, as already described, so that the spool is perfectly free to revolve in either direction independent of the drum and can therefore be used as an ordinary hand reel, and allows the line to be cast out freely as in the ordinary hand reel, which is an operation not heretofore admitted of in automatic reels. With the spring wound up and the spool free to revolve in either direction as just described, the click dog 43, is usually set in engagement with the click wheel, so that when a fish is on the line the angler will be at once notified thereof, so that by grasping the winding drum and turning the same slightly in the direction of winding, the pawl 21, will be automatically disengaged from the idler cog wheel by the spring action of the pin 26, and by then releasing the grip on the drum the rotation thereof under the influence of the spring will actuate the gearing and turn the shaft 20, in a direction that throws out the long end of the clutch plate 37, so as to engage with the screws or pins 36, and thereby rotate the spool in a direction to wind up the line and automatically haul in the fish when played out, and at the same time the drum is released in the manner described, it will be noted that a drag is produced on the line that will cause the fish to be quickly played out before being hauled in.

When it is desired to set the reel for automatic action so that the fish can be hooked, played, broken down, and drawn in automatically, it is simply necessary, after the spring is wound up to allow the drum to rotate slightly in the direction influenced by the spring so as to throw the clutch plate 37, out into the path of the screws or pins 36. By then depressing or moving inwardly the adjusting pin 26, the pawl 21, will be engaged with the cog wheel 18, to lock the drum against rotation. With the reel thus set, the moment the fish is on the line and commences to pull out the same, one of the screws or pins 36, will engage with the clutch plate 37, and thereby start the gearing sufficiently so as to allow the pawl 21, to automatically spring out of engagement with the wheel 18, and thereby place the spring drag on the line and provide means for automatically winding up the line on the spool when the fish has been broken down.

From the above it will be seen that the herein described reel meets every requirement of the angler, and with reference to the click alarm device, it is simply to be additionally noted that in turning the spool with the tubular crank handle, the inner angled end 48, of the spindle 49, will be either carried against one of the lugs 47, of the click dog to disengage the same from the click wheel or against the inner side of the spool 31, after which the spool can continue to rotate without affecting the position of said inner angled end 48, of the spindle, and when the fingers are released from the crank handle, the click dog will be either set or unset, as will be readily understood.

Changes in the form, proportion and the minor details of construction may be resorted to without departing from the principle or sacrificing any of the advantages of this invention.

Having thus described the invention, what is claimed, and desired to be secured by Letters Patent, is—

1. In a fishing reel, a stationary reel plate provided with an offstanding circular spring recess or pocket, a stationary bearing sleeve fitted to said plate and projecting to both sides thereof, a revolving winding drum mounted on the sleeve at one side of the reel plate, a spring seated within said spring recess or pocket, and connected at one end to the reel plate and at its other end to the winding drum, a line spool mounted to revolve on the sleeve at one side of the reel plate and provided with a countersunk side flange loosely embracing the offstanding recess or pocket portion of the reel plate, a reel shaft arranged within said sleeve, an automatic clutch connection between one end of the reel shaft and the spool, a gearing connection between the opposite end of the shaft and the drum, and an automatic gear catch for said gear connection, substantially as set forth.

2. In a fishing reel, a stationary reel plate carrying a stationary bearing sleeve projecting to both sides of the same, a revolving winding drum provided with a central bearing hub turning on one end of said sleeve, a spring arranged between the drum and the reel plate and connected at one end to said plate and at its other end to the drum, a reel shaft turning within said bearing sleeve, a rotating spool loosely mounted on the bearing sleeve, an automatic clutch connection between one end of the reel shaft and the spool, a gearing connection between the opposite end of the shaft and the drum, and an automatic gear catch for said gear connection, substantially as set forth.

3. In a fishing reel, a stationary reel plate carrying an oppositely projecting stationary bearing sleeve, a winding drum mounted on the sleeve at one side of the reel plate, an actuating spring connected to the reel plate and to the winding drum, a line-spool loosely mounted on the sleeve at one side of the reel plate and carrying a series of spaced stop screws or pins, a rotating reel shaft arranged in said sleeve, an eccentrically arranged clutch plate connected with one end of said shaft and adapted to engage with the spool, a stationary plate mounted on one end of the bearing sleeve at one side of the clutch plate, a spring arranged to bear normally against one end of the shaft to hold the clutch plate against the plate at one side of the same to prevent displacement of the clutch plate, gearing connections between one end of the shaft and the drum, and an automatic gear catch for said gear connections, substantially as set forth.

4. In a fishing reel, a stationary reel plate having an oppositely projecting stationary bearing sleeve, a spring actuated winding drum loosely mounted on the sleeve at one side of the plate, a line-spool loosely mounted on the sleeve, a rotating reel shaft arranged on said sleeve, an eccentrically arranged clutch plate connected with one end of said shaft, gearing connections between the opposite end of the shaft and the drum, an automatic gear catch for said gear connections, and means for normally holding the clutch plate out of engagement with the spool to allow the same to freely rotate in either direction, substantially as set forth.

5. A stationary reel plate having an oppositely projecting stationary bearing sleeve, a spring actuated winding drum loosely mounted on said sleeve and provided with an opening in the rim thereof, a reel shaft mounted in said bearing sleeve, a line-spool loosely mounted on said sleeve and having a clutch connection with one end of said shaft, cog gearing between the opposite end of said shaft and the winding drum, one of the parts of the gearing being an idler cog, a catch pawl pivotally secured to the winding drum and adapted to engage with the teeth of said idler cog, a movable pawl adjusting pin arranged within the drum and provided at one end with a push head working in the opening in the rim of the drum and with an inner angled end working against the inner side of said pawl, and a leaf spring arranged within the drum and having its free end bearing on top of the pawl, said spring being arranged to bear at an intermediate point under the push head of the adjusting pin to normally adjust the same against the pawl, substantially as set forth.

6. In a fishing reel, the combination with a stationary bearing spindle, and the spool mounted to revolve thereon; of a toothed click wheel fitted to said stationary bearing spindle, a spring actuated click dog arranged within said spool and normally engaging with the teeth of said click wheel, and means for disengaging the dog from the wheel by the act of turning the spool, substantially as set forth.

7. In a fishing reel, the combination with a stationary bearing spindle, and the spool mounted to revolve thereon; of a toothed click wheel fitted to the stationary bearing spindle, a spring actuated click dog arranged within said spool and normally engaging with the teeth of said wheel, and the crank handle attached to the spool and having an adjusting spindle adapted to be engaged with and disengaged from said click dog by the act of rotating the spool, substantially as set forth.

8. In a fishing reel, the combination with a stationary bearing spindle and the spool mounted thereon; of a toothed click wheel fitted to said spindle, a spring actuated T-shaped click dog pivotally supported within the spool to normally engage said wheel, a tubular crank handle fitted to one end of the spool, an L-shaped adjusting spindle supported at one end of the spool and having at its outer end a rounded friction head registering within the crank handle, and a spring connected with said spindle to hold the head thereof normally in frictional engagement with said crank handle, substantially as set forth.

In testimony that I claim the foregoing as my own I have hereto affixed my signature in the presence of two witnesses.

G. E. MEDLEY.

Witnesses:
   JOHN H. SIGGERS,
   E. G. SIGGERS.